United States Patent [19]

Becker

[11] Patent Number: 4,891,945
[45] Date of Patent: Jan. 9, 1990

[54] BOOST-FAILURE RESPONSIVE FLUID TAPPING VALVE IN TANDEM MASTER CYLINDER WITH BOOSTER PISTON AT PEDAL-REMOTE END OF MASTER CYLINDER

[75] Inventor: Horst-Peter Becker, Floersheim, Fed. Rep. of Germany

[73] Assignee: Alfred Teves GmbH, Frankfurt am Main, Fed. Rep. of Germany

[21] Appl. No.: 81,872

[22] Filed: Aug. 5, 1987

[30] Foreign Application Priority Data

Aug. 11, 1986 [DE] Fed. Rep. of Germany ....... 3627147

[51] Int. Cl.⁴ .............................................. B60T 13/14
[52] U.S. Cl. ..................................... 60/547.1; 60/562; 60/568; 60/593
[58] Field of Search ..................... 60/547.1, 547.3, 553, 60/556, 582, 593, 561, 562, 552

[56] References Cited

U.S. PATENT DOCUMENTS

| 3,815,364 | 6/1974 | Belart et al. | 60/552 |
| 3,827,242 | 8/1974 | Belart | 60/552 |
| 3,855,797 | 12/1974 | Papiau | 60/582 X |
| 4,114,376 | 9/1978 | Cattaneo | 60/548 |
| 4,467,700 | 8/1984 | Udono | 60/547.3 X |
| 4,586,591 | 5/1986 | Belart | 60/547.1 |
| 4,687,259 | 8/1987 | Reinartz et al. | 60/547.1 X |
| 4,702,530 | 10/1987 | Belart | 60/547.1 |
| 4,708,405 | 11/1987 | Belart | 60/547.1 |
| 4,729,609 | 3/1988 | Seibert et al. | 60/547.1 X |
| 4,754,605 | 7/1988 | Seibert et al. | 60/582 X |

Primary Examiner—Robert E. Garrett
Assistant Examiner—George Kapsalas
Attorney, Agent, or Firm—Robert P. Seitter

[57] ABSTRACT

The brake pressure generator (1) includes a tandem master cylinder (2) actuable by two booster pistons (19, 32) to which a hydraulic auxiliary pressure is applied and by a pedal actuating mechanism (17,18). A control valve (14, 20) controls the auxiliary boost pressure. The control valve, through an actuator (16), cooperates with the pedal actuating mechanism (17,18). One booster piston (32) is disposed on the bottom of the tandem master cylinder (2) adjacent the push rod (22). Normally-open valve (37) closes when brake pressure exceeds boost pressure to trap fluid in chamber (34).

7 Claims, 1 Drawing Sheet

BOOST-FAILURE RESPONSIVE FLUID TAPPING VALVE IN TANDEM MASTER CYLINDER WITH BOOSTER PISTON AT PEDAL-REMOTE END OF MASTER CYLINDER

BACKGROUND OF THE INVENTION

The present invention is concerned with a brake pressure generator for a hydraulic brake system for use with automotive vehicles and more particularly, to such a system comprising a master brake cylinder actuable by at least one booster piston to which is applied a hydraulic auxiliary pressure in a booster chamber, and also by a pedal actuating mechanism. Such a system further comprises a control valve means that cooperates with the pedal actuating mechanism for controlling the auxiliary pressure.

Automotive vehicles having an elevated licensed weight require a brake pressure generator having a high boosting factor to maintain the pedal force and the brake pedal distance within the limits predetermined by the desired operating comfort. In a brake pressure generator of this type, an adequately high boosting factor is readily attainable by a suitable control pattern of the auxiliary pressure and by correspondingly dimensioning of the operating surface of the booster piston. However, in the event of a failure of the auxiliary pressure, the actuating forces obtainable by the pedal actuating mechanism will be hardly sufficient to generate the brake pressure required for an adequate deceleration of the automotive vehicle.

To overcome that disadvantage, in a brake pressure generator of the type described in co-pending U.S. application Ser. No. 758,306, filed July 24, 1985 for Braking Pressure Generator For A Hydraulic Brake System For Automotive Vehicles (corresponding to W. German Pat. application No. P 34 28 136.3), the booster piston, on the side facing the master brake cylinder, is provided with a section of smaller diameter to confine a slave cylinder chamber formed as an annular chamber which is reduced in size by the booster piston when applying the brake. The slave cylinder chamber is in communication with a valve controllable by the auxiliary pressure of the hydraulic force booster through which, in case of a failure of the auxiliary pressure, it can communicate with a non-pressurized intake reservoir and, in case of available auxiliary pressure, it can communicate with a working chamber of the master brake cylinder thereby delivering—with an auxiliary-pressure-supported application of the brake—additional pressure fluid from the slave cylinder chamber, through the master brake cylinder, into the brake system. In case of a failure of the auxiliary pressure, the slave cylinder chamber remains ineffective such that the actuation of the brake system, with a correspondingly extended brake pedal distance, is exclusively effected with the aid of the master brake cylinder. This brake pressure generator involves comparatively high efforts, as switching of the slave cylinder chamber requires a hydraulically drivable valve of complex construction. Moreover, it has proved to be disadvantageous in that connection of the slave cylinder chamber to the working chamber of the master brake cylinder involves a pressure impact detectable by the brake pedal.

SUMMARY OF THE INVENTION

It is, therefore, an object of the invention to provide a brake pressure generator of the afore-mentioned type which, with a favorable boosting factor, even in case of a failure of the auxiliary pressure. It is an object of the invention to accomplish this by utilizing an extended pedal distance to provide the generation of an adequate brake pressure with low structural efforts.

These objects are accomplished in that an operating surface of the booster piston directly confines a working chamber of the master brake cylinder, and that the pedal actuating mechanism acts directly upon a master cylinder piston independently of the booster piston thereby providing a brake pressure generator in which the relationship between actuating force—exerted on the pedal actuating mechanism—and brake pressure is determined by the transmission ratio of the transmission between brake pedal and master cylinder piston. The controlled auxiliary pressure applied to the booster piston displaces the booster piston independently of the movement of the master cylinder piston and performs a major part of the displacement work required for generating the controlled brake pressure. The pattern of the master brake cylinder may, therefore, be such that even in the absence of the auxiliary pressure, the sole actuation of the pedal actuating mechanism utilizing the available pedal distance provides an adequate brake pressure and that, in a controlled auxiliary pressure, a pedal distance reduction occurs that corresponds to the needs of convenience of a brake application, with the displacement of the booster piston being determined by the lead of the rise in auxiliary pressure upon initiation of a brake application vis-a-vis the rise in the brake pressure prevailing in the working chamber of the master brake cylinder.

In a sudden failure of the auxiliary pressure during application of the brake, the brake pedal is precluded from sagging through such that the braking process is smoothly completed. One embodiment of the principle of the invention provides that the connecting line interconnecting the booster chamber and the control valve mechanism is closed by a valve once the auxiliary pressure fails. Preferably, the valve, in its basic position, is open and, upon decrease of the auxiliary pressure below the brake pressure in the master brake cylinder, is guided into its closing position.

In the practice of the invention, the operating faces of the booster piston which confine the booster chamber, on the one hand, and the working chamber, on the other, are identical. This causes the auxiliary pressure and the brake pressure to respectively adopt the same value and results in a simplified construction of the control valve means. Another structural simplification of the brake pressure generator of the invention is attained by arranging the booster piston in the bottom of the master brake cylinder.

To preclude the pedal distance, from being excessively reduced through enhanced lead in the auxiliary pressure rise, during a very quick actuating process, the travel of the booster piston, in the actuating direction, can be confined by stop means on the housing. To prevent pressure impacts, said stop means may be resiliently configured. Moreover, it is provided, in the practice, of the invention that, in its resting position, the booster piston, is forced in the direction opposite its actuating movement by spring means which bears against a housing stop. This insures that the booster piston, during releasing of the brake, respectively reaches its resting position and that, in the absence of the auxiliary pressure, no pedal travel loss occurs during retraction of the booster piston.

For structurally simplifying the master brake cylinder, in the practice of the invention, the booster piston and the master cylinder piston may have identical operating faces.

Another advantageous embodiment of the brake pressure generator may reside in that a second booster piston is arranged in series with the pedal actuating mechanism. The operating face of the second booster piston corresponds to the operating face of the first booster piston. An arrangement comprising two booster pistons moving in opposite directions, permits, in simple manner, the operating surface to be enlarged. Applied to the enlarged operating surface is the auxiliary pressure and a higher transmission ratio is provided. However, upon failure of the auxiliary pressure, a higher pedal force is required for attaining identical brake forces. Another advantage involved with this arrangement resides in the simple serviceability of the control valve mechanism. In the practice of the invention, an adjusting mechanism may be provided for actuating the control valve mechanism to transfer relative movement between the pedal actuating mechanism and the second booster piston to the control valve mechanism. The pedal actuating mechanism comprises a reaction piston protruding into the booster chamber of the second booster piston.

BRIEF DESCRIPTION OF THE DRAWING

The invention will now be described in closer detail with reference to one embodiment shown in the drawing wherein.

DETAILED DESCRIPTION OF A PREFERRED EMBODIMENT

Figure 1:
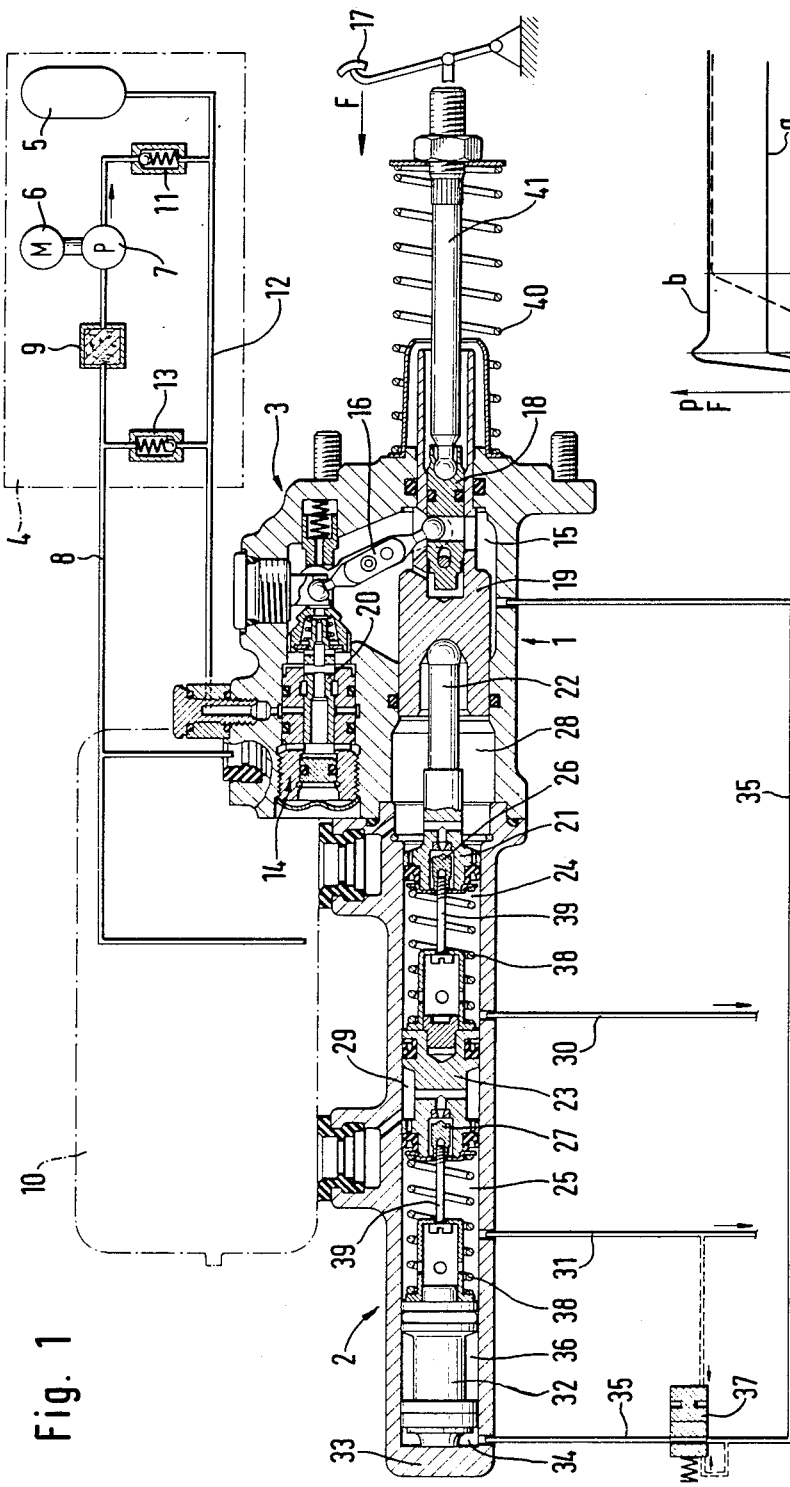
FIG. 1 is a longitudinal section through a brake pressure generator according to the invention and further including a schematic illustration the components in connection therewith; and, FIG. 2 is a diagram of the pattern of the pressures and forces versus time during actuation of the brake pressure generator according to FIG. 1.

The brake pressure generator 1 as shown in the drawing comprises a tandem master cylinder 2 and a hydraulic brake force booster 3 which together form a structural unit. The brake force booster 3 is in communication with a hydraulic energy supply system 4 containing a pressure accumulator 5 loaded by a pump 7 driven by an electromotor 6. From the intake side of the pump 7, a conduit 8, through a filter 9, leads to a non-pressurized intake reservoir 10. Provided on the pressure side of the pump 7 is a check valve 11 precluding flow-back of pressure fluid when the pump 7 is switched-off. The outlet of the pressure accumulator 5, through a pressure line 12, is in communication with pressure relief valve 13 to limit the loading pressure to a predetermined pressure level and to dissipate excessive pressure fluid to the intake reservoir 10.

The brake force booster 3 comprises a brake valve 14 which is in communication with pressure line 12, conduit 8 and booster chamber 15. Brake valve 14 is actuated through a swing lever 16 pivotally disposed in the booster chamber 15 and transmitting relative movement between a reaction piston 18 to a control slide valve 20 of the brake valve 14. The reaction piston 18 is connected to a brake pedal 17 and is slideably disposed in a bore of a booster piston 19 which is in the form of a stepped piston. The operation of the control means is such that, when actuating the brake pedal 17 by a force F an auxiliary pressure is developed in the booster chamber 15. The amount of pressure is in proportion to force F.

The tandem master cylinder 2 comprises a push rod piston 21 which, through a connecting rod 22, is supported on the booster piston 19. Through a floating piston 23, the working chamber of the tandem master cylinder 2 is subdivided into two separate pressure chambers 24, 25. Disposed in the push rod piston 21 and in the floating piston 23, are central valves 26, 27 which are open in the basic position as shown and through which the pressure chambers 24, 25 are in communication with intake chambers 28, 29, respectively, connected to separate chambers of the intake reservoir 10. Brake conduits 30, 31 lead from the two pressure chambers 24, 25 to two separate brake circuits of a brake system for automotive vehicles (not shown).

Disposed on the free end of the pressure chamber 25 is another booster piston 32 the diameter of which corresponds to the diameter of the floating piston 23 and which is in abutment with the bottom (end wall) 33 of the bore of the tandem master cylinder 2. Formed between the booster piston 32 and the bottom 33 is a booster chamber 34 which, through a connecting line 35, is in communication with the booster chamber 15. The booster piston 32 includes two sealants, between which is formed an annular chamber 36 which is in communication with the atmosphere to preclude direct hydraulic communication between the pressure chamber 25 and the booster space 34.

A valve 37 is provided in the connecting line 35 and is held open in its basic position by a spring force. The pressure in line 35 also acts on the valve 37 in the opening direction. The valve 37 is switchable to its closed position by the pressure in the brake conduit 31 when the pressure in the section of the connecting line 35 in communication with the booster chamber 15 falls below the pressure in the brake line 31. In the closed position, the connecting line 35 is blocked by valve 37.

In the basic position as shown, the booster pistons 19 and 32, the push rod piston 21 and the floating piston 23 are positioned by a pair of compression springs 38 and a pair of telescopic stops 39 provided in the compression springs. One spring 38 and its associated stop 39 is disposed on either side of the floating piston 23 so that one spring and stop is in each of the compression chambers 24, 25. The telescopic stops 39 also serve to actuate the central valves 26, 27. The releasing movement of the brake pedal 17 and of the reaction piston 18 is assisted by a compression spring 40 acting upon the pedal rod 41.

The operation of the brake pressure generator 1 will now be described, starting from the brake releasing position as shown in the drawing. In that position, all chambers and spaces of the brake pressure generator loaded with pressure fluid are non-pressurized and in communication with the intake reservoir 10. The predetermined accumulator loading pressure prevails only in the pressure accumulator 5 and in the pressure line 12 of the energy supply system 4.

Figure 2:
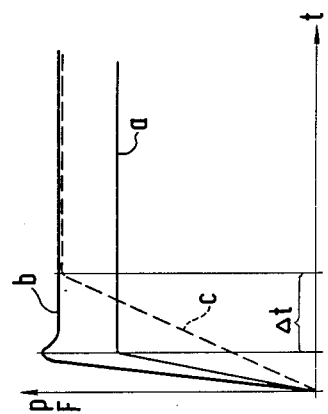

To initiate a decelerating process, a force F is generated by the brake pedal 17 and transmitted from the peal rod 41 to the reaction piston 18. The line a of FIG. 2 shows the amount of force F on a diagram of the force F versus time axis t. The reaction piston 18 is displaced by force F thereby actuating, through swing lever 16, the control slide 20 such that the booster chamber 15 is disconnected from the conduit 8 leading to the intake reservoir 10 and so that pressure fluid is fed from the pressure line 12 into the booster chamber 15 through the connecting line 35 and open valve 37 into the booster space 34. The pressure in the booster chamber 15 and the booster space 34 rapidly rises, reaching its peak value approximately at the same time as force F, as shown by line b in FIG. 2 on the booster pressure p on a diagram of the pressure P versus time axis. The pressure peak of the booster pressure p exceeds the value predetermined by the force F such that the reaction piston 18 to which the booster pressure p is applied, is slightly retracted until the throttling position of the brake valve 14 is attained and has thereby adjusted the booster pressure p to the value resulting from the product of force F with the working face of the reaction piston 18. The amount of the boosting pressure p corresponds to the horizontal portion of line b.

By applying the boosting pressure, boosting pistons 19 and 32 commence to move in the actuating direction toward one another thereby causing the central valves 26, 27 to close and a pressure to develop also in the pressure chambers 24, 25, which propagates, through the brake conduits 30, 31, into the brake system to actuate therein the individual wheel brakes. Because of the resistances of movement and the mass inertia of the booster pistons 19 and 32, the push rod piston 21 and, optionally, the floating piston 23 and owing to the restoring forces of the compression springs 38, the brake pressure in the pressure chambers 24, 25 rises more slowly than the boosting pressure so that the brake pressure only after a time period t has reached its peak value at which the forces on the individual pistons are balanced. The pattern of the brake pressure rise in the pressure chambers 24, 25 is shown in the diagram of FIG. 2 by the broken line c. This time-delayed rise in the brake pressure in pressure chambers 24, 25 causes the two booster pistons 19, 32 to simultaneously move such that the travel of the booster piston 19 and, hence, also the actuating path of the brake pedal 17 amounts to only about half the required actuating stroke of the tandem master cylinder 2 while the second half of the actuating stroke of the tandem master cylinder 2 is performed by the travel of the booster piston 32 in that the same lifts off from the bottom 33. Once the brake pressure has reached its peak value corresponding to the boosting pressure, the booster pistons 19, 32 remain in the position then occupied by them, with the force F exerted by the brake pedal 17 being absorbed by the boosting pressure acting upon the reaction piston 18. The reaction piston 18 and the booster piston 19 are in a relative position in which the inlet and the outlet of the brake valve 14 are closed.

Valve 37, in the actuating process described, remains in its open position because of the boosting pressure in the connecting line 35 leading the brake pressure in the master cylinder chamber 25 and brake conduit 31. If, as a result of malfunction, e.g. failure of the energy supply system 4, the boosting pressure suddenly decreases during a decelerating process, valve 37 will be closed by the brake pressure in the brake conduits 31 which pressure acts in the closing direction. The pressure fluid already fed into the booster space 34 is thereby enclosed such that the booster piston 32 maintains the actuating position attained. The decelerating process, hence, can be continued without any noteable pedal distance loss in that the actuating force F, through the reaction piston 18, is directly transmitted to the booster piston 19 and the push rod piston 21. If the hydraulic operating face of the reaction piston 18 is smaller than the hydraulic operating face of the booster piston 19 (as in the embodiment shown), the actuating force F required for maintaining the brake pressure will, however, have to be increased in accordance with the reciprocal of the said surface ratio. The hydraulic operating faces of the reaction piston 18 and of the booster piston 19 are, therefore, such that an adequate brake effect can still be achieved by the maximum force F exertable on the brake pedal. Once the brake is released, the valve 37 returns to its open position under the influence of its associated spring as soon as the brake pressure in the brake line 31 has fallen below a predetermined value. The pressure in the booster space 34, hence, can then decrease such that the booster piston 32 returns to its basic position on the bottom 33.

If, in an actuation of the brake pressure generator 1, no boosting pressure is available from the very start, the actuating process can be performed solely with the aid of the brake pedal 17 through displacement of the booster piston 19 and of the push rod piston 21 in that the entire brake pedal distance is exploited. The brake pressure generator as described, therefore, conveys a high degree of safety against failure.

Valve 37 may also be in the form of an electromagnetic valve, with the control corresponding to the brake pressure in the brake line 31 being provided by closing a stoplight switch. Moreover, the brake pressure generator of the afore-described type is suitable for use in a hydraulic brake system for automotive vehicles comprising a brake slip control means, since a pedal distance reserve is provided by the actuating stroke of the booster piston 32 to insure, in case of failure of the brake skid control system, continuation of the decelerating process.

What is claimed is:

1. A brake pressure generator for a hydraulic brake system of automotive vehicles, said system comprising a master brake cylinder having a master cylinder piston and a working chamber for connection to a brake circuit, pedal actuating means adapted to act on the master cylinder piston and located at one end of the master cylinder, a hydraulic brake force booster having a booster chamber and a slideably disposed booster piston disposed in the opposite end of the master cylinder relative to the pedal actuating means with one operating surface of the booster piston being adjacent and directly confining the working chamber of the master cylinder, connecting means for connecting the booster chamber at the opposite end of said master cylinder to a hydraulic auxiliary pressure source, control valve means for controlling auxiliary pressure in the booster chamber, said pedal actuating means acting directly on the master cylinder piston upon the failure of auxiliary pressure and separately from the auxiliary pressure, and means to maintain pressure in the booster chamber to prevent displacement of said booster piston upon failure of auxiliary pressure, wherein said means to maintain pressure in the booster chamber includes a valve located between the connecting means and the booster chamber, said valve being normally open and being closeable upon failure of auxiliary pressure, said valve being controlled into its closing position upon decreasing of auxiliary pressure below the brake pressure in the master brake cylinder.

2. A brake pressure generator according to claim 1 wherein the booster piston has another operating surface in the booster chamber, the one and another operating faces being identical.

3. A brake pressure generator according to claim 1 wherein the operating faces of the booster piston and of the master cylinder piston are identical.

4. A brake pressure generator according to claim 1 including stop means for confining the travel of the booster piston in the actuating direction.

5. A brake pressure generator according to claim 4 including spring means urging the booster piston in a direction opposite its actuating direction against a housing stop.

6. A brake pressure generator according to claim 1 including a second booster piston disposed in series with the pedal actuating mechanism, the operating face of the second booster piston corresponds to the operating face of the first booster piston.

7. A brake pressure generator according to claim 6 wherein actuating means is provided for actuating the control valve means, an adjusting mechanism transmitting a relative movement between the pedal operating means and the second booster piston to the control valve means, the pedal actuating means comprising a reaction piston extending into the booster chamber of the second booster piston.

* * * * *